United States Patent [19]

Engelmann

[11] Patent Number: 4,463,292

[45] Date of Patent: Jul. 31, 1984

[54] SECURITY TIMER FOR AUTOMATIC GARAGE DOOR OPENER

[76] Inventor: Robert J. Engelmann, 7271 Vanessa, Fort Worth, Tex. 76112

[21] Appl. No.: 451,063

[22] Filed: Dec. 20, 1982

Related U.S. Application Data

[63] Continuation-in-part of Ser. No. 243,480, Mar. 13, 1981, abandoned.

[51] Int. Cl.[3] .............................................. H02P 1/04

[52] U.S. Cl. .................................... 318/283; 318/285; 318/467

[58] Field of Search ............................... 318/467, 283

[56] References Cited

U.S. PATENT DOCUMENTS 4,035,702 7/1977 Pettersen et al. .................. 318/467

4,364,003 12/1982 Phipps ................................ 318/467

*Primary Examiner*—G. Z. Rubinson

*Assistant Examiner*—Bentsu Ro

*Attorney, Agent, or Firm*—James E. Bradley

[57] ABSTRACT

A security timer for a powered overhead garage door causes the garage door to close after it has been opened for a selected time interval. The security timer includes an oscillator that provides pulses. A counter counts the pulses and provides a binary output. A timer switch is engaged by the door when the door is fully open. Engagement of the timer switch signals the oscillator and counter to begin. When the desired number of pulses has been counted, a relay switch is closed for signaling the operator unit of the door to close the door.

6 Claims, 2 Drawing Figures

SECURITY TIMER FOR AUTOMATIC GARAGE DOOR OPENER

CROSS-REFERENCE TO RELATED APPLICATION

This application is a continuation-in-part of application Ser. No. 06/243,480, filed Mar. 13, 1981, Security Timer for Automatic Garage Door Opener, now abandoned.

BACKGROUND OF THE INVENTION

This invention relates in general to motor powered overhead garage doors, and in particular to a security timer for automatically closing the garage door after it has been open a selected time interval.

Many residences have overhead garage doors. This type of door rolls on tracks from a closed vertical position to a horizontal position a short distance below the ceiling of the garage. Many of these overhead doors have electric motors for raising and lowering the doors. A manual wall switch will cause the door to open or close. Also, many have a radio receiver for causing the door to open or close. A small transmitter is carried in the automobile for signaling the receiver to open or close the door. This avoids the need for the driver to get out of the car to open and close the door.

One problem with overhead doors is that occasionally they are accidentally left open by the driver. Also, occasionally the radio receiver may receive stray radio frequency signals that cause it to open the door while the resident is away. Electrical power fluctuations may also cause the door to open. Not only does an open door provide access for intruders to the garage, but it also makes it easier for a burgular to break into a door leading from the garage to the house.

There have been a number of proposals for closing and opening doors automatically, such as shown in U.S. Pat. Nos. 3,060,361; 3,510,982; 2,758,836; 1,928,698; 1,874,903; 2,138,521; 2,871,009; and 1,040,504. However, these proposals are generally mechanical in nature and are difficult to implement because they require specially made mechanical parts. U.S. Pat. No. 4,035,702, Petterson et al., discloses an electronic device for closing a garage door after it has remained open for a selected time period. There are disadvantages to this proposal, one of which is that electrical power is continually supplied to the system even though the door is closed. This may result in earlier failure than a system that receives power only when the door is open. Also, there is no provision to vary the time delay between opening and closing. Some users may prefer a different delay than others. Another problem is that the door starts closing without warning. This might result in the door closing on a vehicle or locking a person out of his house.

SUMMARY OF THE INVENTION

The security device of this invention consists of solid state electronic components. The device includes an oscillator and counter for providing pulses and for counting the pulses and for providing binary outputs corresponding to the number of pulses counted. The unit has signal means for actuating the oscillator and counter means when the door is open. An actuating means is actuated by an output from the counter after a selected number of pulses has been counted. The actuating means causes the operator unit to close the door.

In the preferred embodiment, the oscillator and counter are powered by the existing operator unit. The signal means comprises a timer switch that is mounted near the operator unit for contact by the door when the door reaches its fully open position. The actuating means includes a relay switch mounted in parallel with the existing operator manual switch. The warning system components receive power only when the timer switch closes. The system includes a potentiometer for varying the frequency of the oscillator to vary the time delay between opening and closing. A warning signal is produced before the door begins to close.

DESCRIPTION OF THE PREFERRED EMBODIMENT

Figure 1:
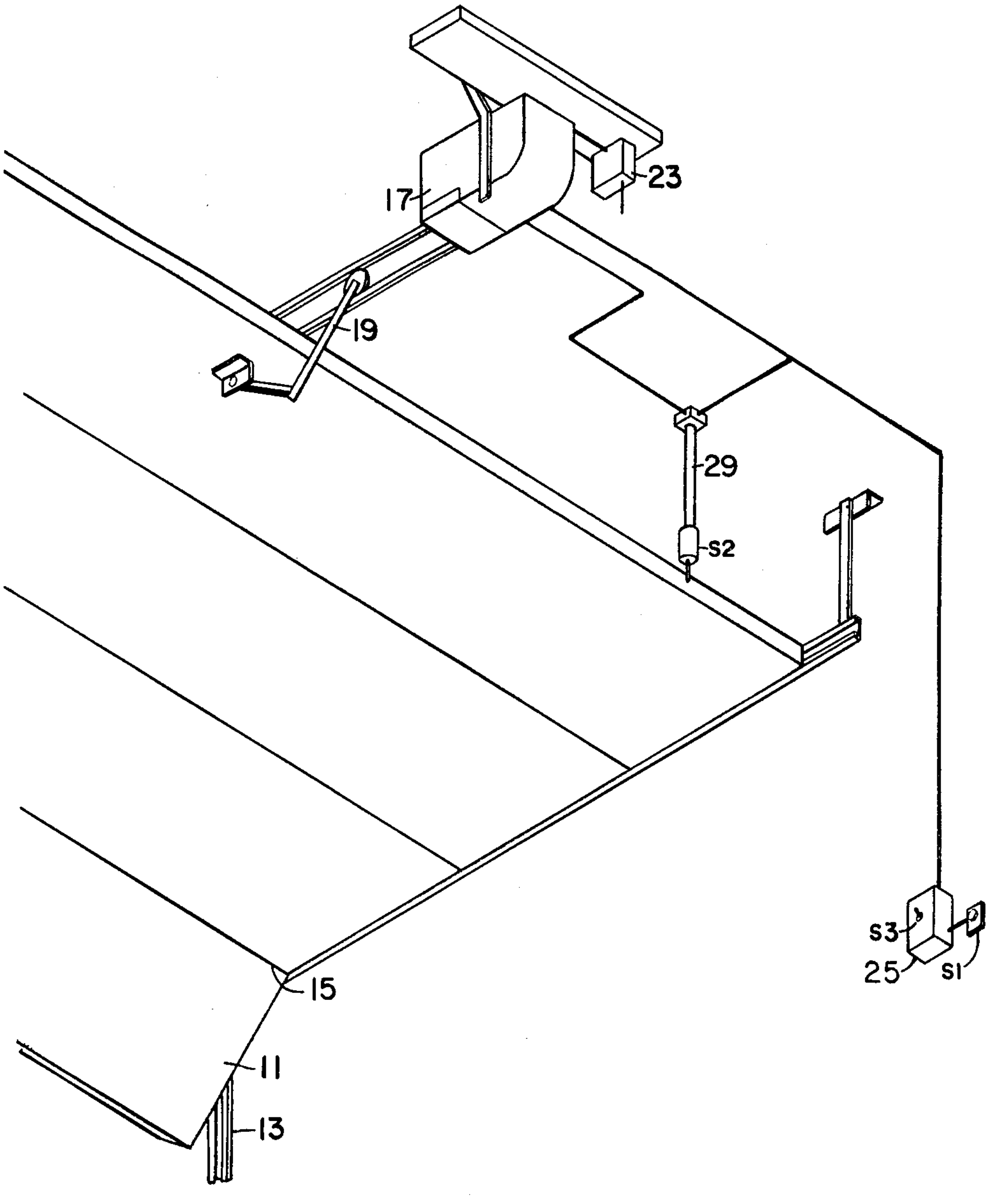
FIG. 1 is a perspective view illustrating a powered garage door having a security system in accordance with this invention.

An overhead door 11 is shown in FIG. 1. Door 11 is mounted on tracks 13 so that it can be moved from a closed vertical position to an open position above the garage floor as shown. Often door 11 will contain horizontal hinges 15 to facilitate the opening and closing movement. An electrically powered operator 17 is mounted to the ceiling and connected to the door by brackets 19 for opening and closing the door. A manual switch S1 is mounted on the wall of the garage for causing the operator 17 to open or close the door 11. A radio frequency receiver 23 is mounted near operator 17 for receiving transmissions from a transmitter (not shown) to open or close door 11.

The system in FIG. 1 also includes a security system, part of which is mounted in box 25 near manual switch S1. A timer switch S2 extends downwardly from the garage ceiling by means of a bracket 29. Timer switch S2 is mounted so as to be contacted by door 11 when the door is within about one inch from its fully open position. A disabling switch S3, mounted to box 25, disengages the security system if desired, so that the door 11 can remain in an open position indefinitely.

Figure 2:
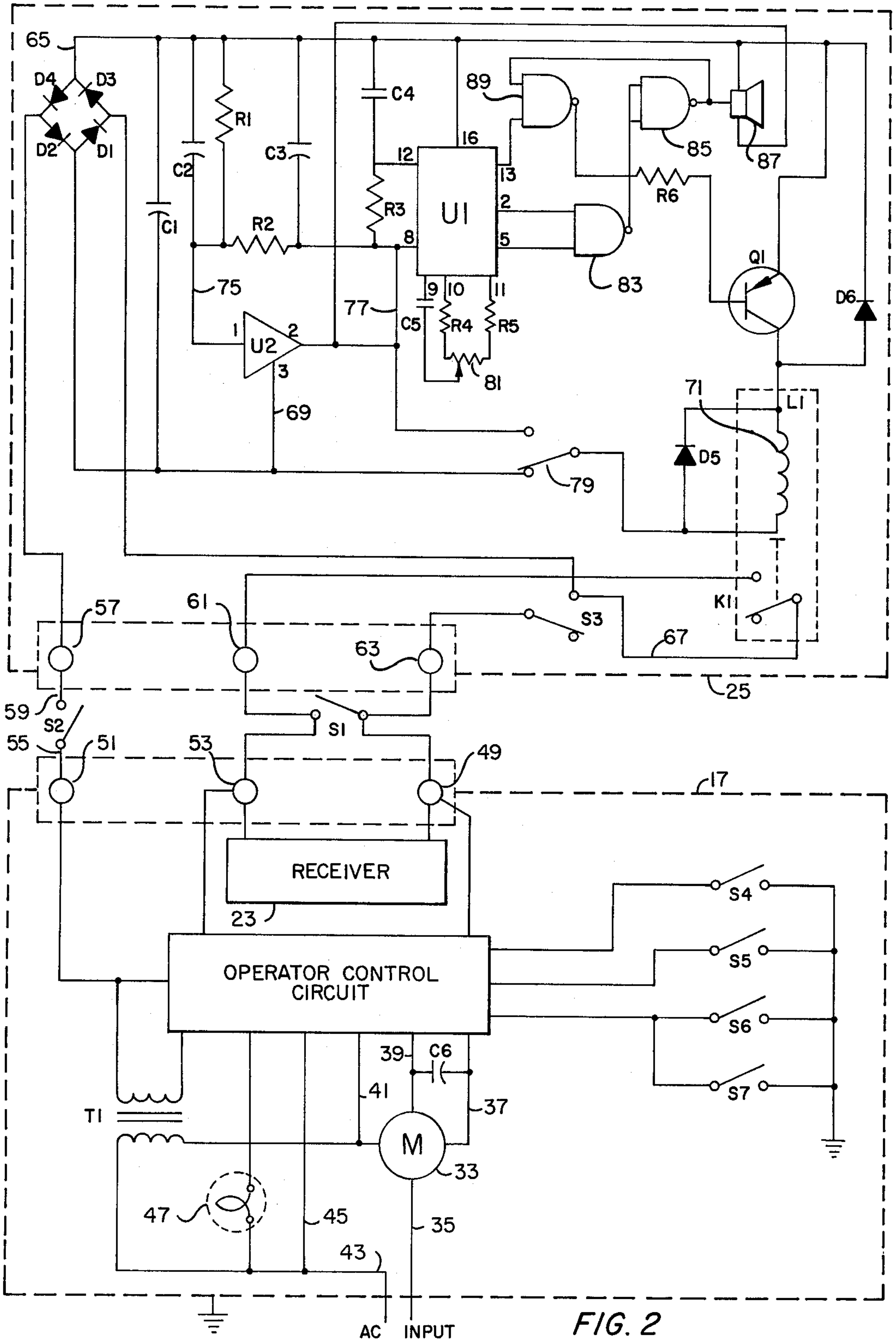
FIG. 2 is a schematic diagram illustrating the security system and operator unit of the powered door of FIG. 1.

Referring to FIG. 2, the operator unit uncludes an electrical motor 33 having one lead 35 connected to AC current. Three other leads 37, 39 and 41 lead to an operator control circuit. A capacitor C6 is connected between lines 37 and 39 for capacitive starting. Another AC line 43 leads to one side of the primary of a transformer T1. The other side of the primary of transformer T1 extends to line 41. The transformer T1 secondary is connected to the operator control circuit. Another line 45 extends from AC line 43 to the operator control circuit. A lamp 47 is connected between AC line 43 and the operator control circuit. A light switch S4 is connected to the operator control circuit for turning on the light 47. Most operator units also have a reverse switch S5 that closes to reverse the motor 33 if an obstruction is reached before its normal fully closed position. Two limit switches S6 and S7 are connected in parallel and to the operator control circuit for stopping motor 33 when the door is at the fully open position and also when the door is at the fully closed position.

Substantially all the operator control circuits have three external connections or terminals. Terminal 49 is a voltage terminal, which cooperates with a common terminal 51 to define power terminals. Depending upon the particular operator control circuit, the voltage between power terminals 49 and 51 may be either AC or DC, and is normally about 30 volts. One side of the secondary of transformer T1 leads to common terminal 51. The third terminal 53 is a relay terminal leading to the relay means in the operator control circuit for turning on the motor 33 to either open or close the door. Manual switch S1 is normally open and connected between one of the power terminals 49 or 51. Radio frequency receiver 23 is normally connected in parallel with manual switch S1 for causing the door 11 to open or close on reception of a signal from a transmitter (not shown).

The security system is adapted to be coupled to the prior art operator unit. Timer switch S2 is a normally open limit switch that is connected to the operator unit common terminal 51 by means of a lead 55. The other side of switch S2 is connected to a timer terminal 57 by means of a lead 59. The relay side or normally open side of manual switch S1 is connected to a terminal 61 on the timer unit. The wiper or power side of manual switch S1 is connected to a terminal 63 on the timer unit.

A full wave rectifier comprising four diodes D1, D2, D3 and D4 connected as a bridge circuit is used in the security system. The junction of diodes D2 and D4 is connected to terminal 57. Another line 65 leads from the junction of diodes D3 and D4 to the emitter of PNP transistor Q1. Terminal 61 is connected to the normally open side of a relay switch K1. Terminal 63 is connected to the wiper side of the disabling switch S3. Disabling switch S3 is a two position switch and is shown in the off position. The other side of disabling switch S3 is connected into a line 67 that extends from the wiper side of relay switch K1 to the junction of diodes D1 and D3. A line 69 extends from the junction of diodes D2 and D1 to voltage regulator U2 pin 3. Diode D5 is connected in parallel with the solenoid coil L1 of relay switch K1. The anode of diode D5 is connected to a jumper 79 that can be connected to line 69 to supply one voltage, preferably 24 volts. Or jumper 79 can be connected to line 77 to supply output voltage from regulator U2, which is 12 volts. The selection of 12 volts or 24 volts depends upon the type of relay K1. The collector of transistor Q1 is connected to the opposite side of relay solenoid L1 by means of line 71.

A filtering capacitor C1 is connected between timer power circuit lines 65 and 69. A capacitor C2 and resistor R1 are connected between line 65 and a line 75. Line 75 is also connected to one side of resistor R2 and voltage regulator U2, pin 1. The other side of resistor R2 is connected to a line 77. Line 77, which extends from the output pin 2 of the voltage regulator U2, is connected to pin 8 of an integrated circuit U1. A capacitor C3 and resistor R3 are connected to line 77. The other side of capacitor C3 is connected to power line 77. The other side of capacitor C3 is connected to power line 65. The other side of resistor R3 is connected to pin 12 of integrated circuit U1. A capacitor C4 has one side connected to power line 65 and the other side to pin 12 of integrated circuit U1. Integrated circuit U1 is a combination oscillator and counter and will be described subsequently.

Integrated circuit U1 has a pin 16 that is connected to power line 65. A pin 9 of integrated circuit U1 leads to a capacitor C5. A pin 10 leads to a resistor R4. A pin 11 leads to resistor R5. The sides of resistors R4 and R5 opposite pins 10 and 11 are connected to a potentiometer 81, the wiper of which is connected to capacitor C5. Capacitor C5, resistors R4 and R5 and potentiometer 81 set the frequency of the pulses provided by the oscillator portion. Potentiometer 81 serves as a means to vary the frequency. A counter contained within the integrated circuit U1 counts the pulses and provides a binary output to three output terminals indicated as pins 2, 5 and 13.

Of the three output terminals of integrated circuit U1, pin 2 corresponds to the most significant bit and will go high and remain high after pins 13 and 5 have gone high. Pin 13 is the next significant bit and pin 5 the least significant bit. Pins 2 and 5 are connected to a NAND gate 83, which provides a low output to a NAND gate 85 when both pins 2 and 5 are high. NAND gate 85 provides a high output to a buzzer 87 when both its inputs are low. Buzzer 87 is connected between power lines 65 and 77 to provide a buzz on receipt of a high output from NAND gate 85. After a selected time interval from actuation of timer switch S2, and about ten seconds before pin 13 goes high, pin 2 goes high and remains high. While pin 2 is high, pin 5 will simultaneously toggle between high and low, causing buzzer 87 to provide buzzes of short duration equal to the time when pin 5 is high. Eight buzzes later, pin 13 goes high. The duration of the eight buzzes and the delay before pin 13 goes high varies with the setting of potentiometer 81, and is about 10–15 seconds.

The high on pin 13 is supplied to a NAND gate 89. The other input of NAND gate 89 is connected to the output of NAND gate 85, which will also be high at that time. The two high inputs provide a low output to the base of transistor Q1. The low output causes transistor Q1 to conduct, supplying power from line 65 through inductor 71. Resistor R6 connected between the output of NAND gate 89 and the base of transistor Q1 limits current on the base of transistor Q1.

In operation, to open the door, either the receiver 23 (FIG. 1) will receive an input or manual switch S1 will be depressed. In either case, a momentary connection is made between terminals 49 and 53 of the operator control circuit. The operator control circuit then supplies power to the motor 33 to raise the door. The upward movement of door 11 will have no effect on the security timer circuit until the door reaches its fully open position. As the door nears its fully open position, it will contact the open limit switch S6, which signals the operator control circuit to turn motor 33 off. At about the same time, door 11 will contact timer switch S2 and close it.

If the timer disabling switch S3 is in the "on" position, as will be the usual case, timer switch S2 will complete a common line between diodes D2 and D4. This connection completes a power circuit from terminal 49, switch S3 and line 67 to the intersection of diodes D1 and D3. DC current produced as a result on line 65 will be limited by resistors R1 and R2, which also determine the output voltage of the voltage regulator U2. Capacitors C2 and C3 will filter the input and output voltage of voltage regulator U2. This will result in voltage regulator U2 appying a 12 volt differential between integrated circuit pins 16 and 8.

A potential between pins 8 and 16 causes capacitor C4 and resistor R3 to generate a reset pulse to pin 12 of integrated circuit U1. The reset pulse causes all of the counter outputs to go to zero volts reference to pin 8 of integrated circuit U1. The oscillator means in the integrated circuit U1 will begin generating pulses, with potentiometer 81 setting the frequency. Potentiometer 81 will be conveniently located for access by the user. The counter means within integrated circuit U1 will count the pulses and provide binary outputs to pins 13, 2 and 5. High outputs on pins 2 and 5 energize the buzzer 87 to begin sounding warnings. A slower frequency selected will provide more time before pins 2 and 5 go high, with the inverval being variable from about three to nine minutes. A positive or high output on pin 13 will occur to cause transistor Q1 to conduct, providing current to relay coil L1. This causes relay switch K1 to go from its normally open position, as shown, to a closed position. The relay switch K1 is in parallel with the receiver and manual switch S1, thus when closed, relay switch K1 will complete a circuit from voltage terminal 49 to relay terminal 53 of the operator unit. This signals the operator control circuit to actuate motor 33 to close the door.

After the door has moved about one inch from its fully open position, switch S2 will spring back to its normally open position. This disconnects the power to the timer unit. As the capacitor C1 discharges, the relay coil L1 collapses, opening the contact of relay switch K1. After this occurs, the security timer has no effect on the operator unit until the garage door is again in a fully open position. The motor will continue until the door is fully closed.

In the preferred embodiment, for integrated circuit U1, a RCA integrated circuit No. CD4060BE is used. The buzzer 87, NAND gates 83, 85 and 89 and voltage regulator U2 are also conventional components.

In the security system, timer switch S2 serves as signal means for actuating the oscillator and counter means when the door is open. Transistor Q1, relay coil L1, and relay switch K1 serve as actuating means, actuated by an output from the oscillator and counter means that occurs after a selected number of pulses has been counted, for causing the door to close. Relay switch K1 serves as an actuating switch, connected in parallel with the manual switch of the operator unit, for causing the control circuit to close the door.

The security system can be connected to any existing operating unit that has three external connections, voltage (either AC or DC), relay, and common. To connect the security system, one wire from the timer terminal 63 is connected to the side of the manual switch S1 that is connected to the voltage terminal 49 of the operator unit. A wire from the timer terminal 61 is connected to the other side of the manual switch S1. Then the timer switch S2 is connected to a bracket, and the bracket is mounted to the ceiling in a position where the switch will be depressed by the top edge of the door when the door is opened. A wire 59 is connected from the timer terminal 57 to one side of timer switch S2. A wire 55 is connected from the other side of timer switch S2 to the common terminal 51 of the operator unit. If the connections are reversed, the unit will not operate, but no damage should result because the integrated circuit is isolated by means of the diodes in the bridge circuit.

The invention has significant advantages. It is easily connected to existing powered garage doors. The unit will accept either AC or DC inputs from the garage door. The time delay on the unit can be adjusted simply by changing the setting of the potentiometer. The warning signal provided before the door begins to close provides time for the user to disable the automatic closing before it begins to close. The potentiometer also varies the amount of time between between initial sounding of the buzzer and closing. Since the device receives its power from the external connections provided in the operating unit, the installation is greatly simplified. Power is supplied to the security unit only when the door is open. This increases the mean time between failures over a system that continually receives power. The cost is low and the reliability high because of the omission of any mechanical components that may cause difficulties in maintenance. No mechanical changes are required to the existing unit. The timer can be deactivated by the disabling switch.

While the invention has been shown in only one of its forms, it should be apparent to those skilled in the art that it is not so limited but is susceptible to various changes and modifications without departing from the spirit of the invention.

I claim:

1. Security means for automatically causing a powered overhead door to close after it has been open for a selected time interval, comprising:

- oscillator and counter means for providing pulses, for counting the pulses, and for providing outputs corresponding to the number of pulses counted;
- signal means for causing the oscillator and counter means to begin operation when the door is open;
- actuating means, actuated by an output from the oscillator and counter means that occurs after a selected number of pulses has been counted, for causing the door to close; and
- variable means for varying the frequency of the oscillator and counter means to selectively vary the time from opening of the door to the closing of the door by the actuating means, the oscillator and counter means being supplied with power only when the door is open.

2. In a powered overhead door of the type having a motor to raise and lower the door, control circuit means for controlling the motor, the control circuit means having two power terminals and a relay terminal, with a manual switch connected between one power terminal and the relay terminal to complete a circuit through the relay terminal when the manual switch is closed, for causing the control circuit means to open and also to close the door, the improvement being a security means for automatically closing the door after a selected time interval, comprising:

- oscillator and counter means for providing pulses, for counting the pulses, and for providing binary outputs corresponding to the number of pulses counted;
- power means having two input leads, each connected to one of the power terminals, for powering the oscillator and counter means;
- a timer switch means mounted for engagement by the door, and connected into one of the input leads of the power means for supplying power from the power means to the oscillator and counter means only when the door open;
- a relay coil having a relay switch connected in parallel with the manual switch; and
- a transistor connected between the power means and the relay coil for passing current to the relay coil, the transistor having a control input connected to an output terminal of the oscillator and counter means for causing the transistor to conduct when the output terminal provides a selected response.

3. The security means according to claim 2 wherein the power means includes:

a rectifier connected to the power terminals for rectifying any alternating current received from the power terminals; and voltage regulator means connected across outputs of the rectifier for providing a constant voltage differential between the rectifier outputs, the voltage regulator means being connected to the oscillator and counter means.

4. The security means according to claim 2 further comprising variable means for varying the frequency of the pulses of the oscillator and counter means to select the time interval for automatically closing the door after the door has opened.

5. The security means according to claim 2 further comprising warning means for providing an audible signal a selected time after the door has opened but a selected time before the security means starts to automatically close the door.

6. The security means according to claim 2 wherein the timer switch means is mounted so as to cut the power from the power means to the oscillator and counter means once the door moves a selected distance toward closing but before fully closing.

* * * * *